United States Patent Office 3,383,640
Patented May 14, 1968

3,383,640
QUICK CONNECT WIRE CONNECTOR
Zdzislaw R. Godziemba-Dambski, Bolton, Ontario, and Joseph F. Duffield, Georgetown, Ontario, Canada, assignors to Smith & Stone Limited, Toronto, Ontario, Canada, a corporation of Canada
Filed Jan. 4, 1966, Ser. No. 518,692
Claims priority, application Canada, Aug. 5, 1965, 937,363
4 Claims. (Cl. 339—95)

ABSTRACT OF THE DISCLOSURE

A low current quick connect electrical terminal or contact of particular utility in combination with receptacles receiving male plug-in type contacts, and wherein electrical connection is effected with a locally stripped conductor received between a pair of resilient arms forming part of a U-shaped member, which arms are restrained from outward extension and at least one arm of which includes sharp cutting edge positioned for preventing inadvertent release of said conductor, there being provided means for releasing said conductor when necessary.

---

This invention relates to electrical connectors and more particularly to electrical connectors for use in domestic electrical appliances and other devices carrying comparatively low currents.

In the past, many electrical connectors have been unduly complex and unnecessarily robust in terms of the current carrying capacity required. The need for simplicity in some electrical appliances have become apparent where the space available has been reduced or where it has been desired to make electrical connections without the use of soldering or the use of nuts or screws. Many electrical appliances and devices are susceptible to the inclusion of electrical connection means which may be regarded as of substantially permanent nature. That is, where a wire is to be connected to a contact strip or conductive element within an appliance there is generally no need to provide means for periodically disconnecting the wire.

The present invention contemplates providing a means for joining a pair of wires or of joining a wire to a conductive member within a terminal block or electrical appliance. The invention further contemplates providing a quick connect wire connector which requires only that the wire, locally stripped of its insulation, be inserted into an aperture and subsequently into an electrical connector having a biting edge which prevents the wire from being withdrawn after once having been inserted into the connector. Thus, the invention provides a quick and positive means for effecting mechanical and electrical connection of a wire conductor to a terminal member such as a wiring device or a conductive portion of an electrical appliance. No tools are necessary for releasing the wire but should the wire need to be subsequently removed it is proposed that a further short length of the same gauge wire, stripped of its insulation, be used for releasing the connected wire.

It is an object of one aspect of the invention to provide a quick connect wire connector.

In accordance with the foregoing object the invention comprises: a generally U-shaped electrically conductive element formed of a resilient material, said U-shaped element including first and second arms one pair of adjacent ends of which are joined together along a joint line, said arms diverging slightly away from said joint line, said arms being adapted to receive and frictionally engage an uninsulated wire inserted therebetween, at least one arm being laterally deformed along a selected line disposed parallel to said joint line away from the opposite arm thereby permitting easy entry of said wire, the said one arm including an aperture having a cutting edge formed at said selected line for engagement with said wire and for the prevention of withdrawal of said inserted wire.

A preferred embodiment of the invention will now be described with reference to the accompanying drawings, in which.

Figure 1:
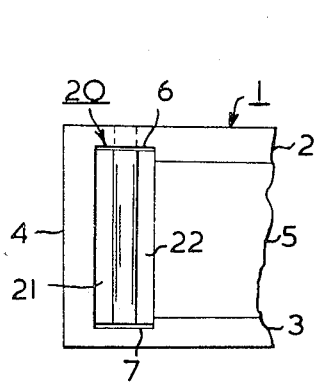
FIG. 1 is a plan view of a portion of an insulated housing.
Figure 4:
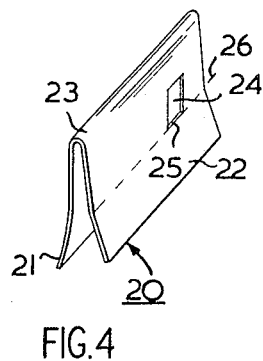
Figure 2:
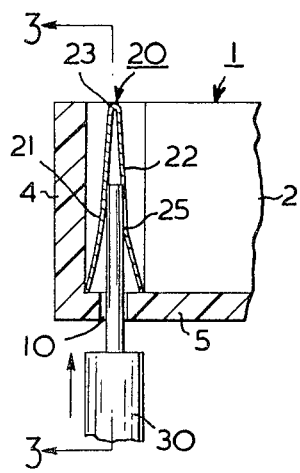
FIG. 2 is a side view, partly in section, of the housing shown in FIG. 1.

Referring now to FIGS. 1 to 4, there is shown an insulated housing member 1, having side walls 2 and 3 and end walls, one of which is indicated at 4. The housing is open at the top and closed at the bottom by a base 5. Side walls 2 and 3 are both recessed as at 6 and 7, wherein the said recesses extend from the open top down to the base 5. The base 5 includes a pair of apertures 10 and 11 and the side wall 2 includes an aperture 12 extending through the outer wall 2 in the center of the recess 6. The recesses 6 and 7, the apertures 10 and 11 and the aperture 12 all lies in substantially the same plane. The housing 12 may be molded in any suitable plastic material and additional apertures corresponding to apertures 10 and 11 may be included in the base and a further aperture corresponding to aperture 12 may be included in the side wall 3.

Referring now to FIGS. 1 to 4, there is shown a connector generally indicated at 20. The connector 20 comprises a pair of spring arms 21 and 22 integrally joined together as at 23 to form an inverted U-shape. The arms 21 and 22 diverge outwardly adjacent the joint, as shown, and intermediate their length are curved outwardly. Arm 22 includes an opening 24 of rectangular configuration and having a lower edge 25 disposed adjacent a more predominate line of bending 26 shown best in FIG. 4 thereby forming a cutting edge along the line 26.

Figure 3:
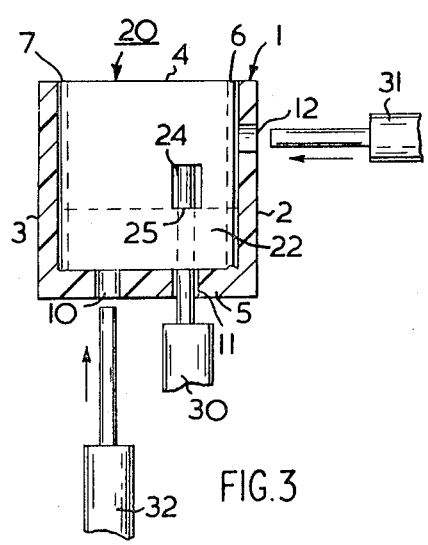
FIG. 3 is an end view, partly in section, taken along the line 3—3 in FIG. 2, and, FIG. 4 is an isometric view of the connector incorporated in the housing shown in FIGS. 1, 2 and 3.

The connector 20 is adapted to be received in the recesses 6 and 7 in the housing 1. In such a position, the plane of symmetry of the connector is substantially coplanar with the plane containing apertures 10, 11 and 12, and in a plane perpendicular to this first mentioned plane rectangular opening 24 lies in the plane containing aperture 11 as best seen in FIG. 3.

In operation, a wire 30 to which electrical connection is to be made, is inserted into aperture 11 and subsequently between the arms 21 and 22 of the connector 20 until the convergence of the arms prevents further insertion. The cutting edge 25 permits the wire 30 to be received between the arms but at the same time, its uni-directional property prevents the wire 30 from being subsequently withdrawn. Should it be necessary to withdraw the wire 30, a release wire 31 may be inserted into aperture 12 in the side wall 2 where the wire 31 will serve to spread apart the arms 21 and 22 of the connector 20, thereby releasing the wire 30 for its subsequent withdrawal. Similarly, the wire 30 may be released by the insertion of a wire 32 into aperture 10 in the base 5 where it too will serve to spread apart the side arms 21 and 22 of the connector 20.

It will be obvious to those skilled in the art that the connector 20 may be of any suitable length and that it may include as many openings 24 as there are electrical connections to be made. Again, it will be obvious that should the electrical connector 20 be of sufficient length to render ineffective the release by a wire 31 inserted into aperture 12, that the alternative release aperture 10 and the use of a release wire 32 will be more effective for such an embodiment. Again, it is envisaged that apertures 10 and 11 or a further number of such apertures be included with a corresponding opening 24 for each so that the wire connector may be used for forming a junction between a plurality of wires 32, etc. in which case no further connections may be contemplated, and also that apertures 24 may be included in both arms 21 and 24.

The present invention provides an extremely effective means of making electrical connections between at least two wires or between a single wire and other conductive devices within electrical appliances. The quick connect wire connector according to the present invention is extremely inexpensive to manufacture and may be used for very rapid assembly of electrical devices and appliances without the use of soldering or tools. The invention provides a quick connect wire connector which having no nuts or screws thereupon, is susceptible to miniaturization and production with a minimum of material wastage.

Other embodiments falling within the terms of the appended claims will occur to those skilled in the art.

We claim:

1. A quick connect electrical receptacle comprising a hollow body member including a conductor-receiving first aperture therein, a recess within said body for receiving a U-shaped resilient electrical contact having a pair of arms restrained from outward extension at the outer ends by said recess, one of said arms including a hole therein forming a cutting edge positioned to prevent the inadvertent release of a conductor received between said arms through said first aperture, said body member further including a second aperture substantially in the same plane as said first aperture and through which a release probe may be forced between said arms to effect release of said conductor.

2. The quick connect electrical receptacle of claim 1 wherein both of said arms include a hole therein forming a cutting edge positioned to prevent inadvertent release of a conductor received between said arms.

3. The quick connect electrical receptacle of claim 1 wherein said body member further includes at least another aperture through which another release probe may be inserted between said arms.

4. A quick connect electrical receptacle comprising a hollow body member including a conductor-receiving first aperture therein, a recess within said body for receiving a U-shaped resilient electrical contact including first and second arms the free ends of which are received in said recess and are restrained from outward extension, said arms diverging slightly outwardly and being adapted to receive and frictionally engage a conductor therebetween through said first aperture, at least one arm including an aperture having a cutting edge positioned for engagement with said conductor and for the prevention of inadvertent withdrawal of said inserted conductor, said body member further including a second aperture substantially in the same plane as said first aperture and adapted to receive a release probe between said arms to force said arms outwardly thereby releasing said conductor.

References Cited

UNITED STATES PATENTS

| 2,496,866 | 2/1950 | Flora. |
| 2,718,626 | 9/1955 | Benander. |
| 2,913,698 | 11/1959 | Bromley. |
| 2,946,036 | 7/1960 | Bettencourt. |

MARVIN A. CHAMPION, *Primary Examiner.*

JOSEPH H. McGLYNN, *Assistant Examiner.*